(12) United States Patent
Sela

(10) Patent No.: US 11,995,209 B2
(45) Date of Patent: May 28, 2024

(54) CONTEXTUAL TEXT DETECTION OF SENSITIVE DATA

(71) Applicant: NetApp, Inc., San Jose, CA (US)

(72) Inventor: Sheli Sela, Telaviv (IL)

(73) Assignee: NetApp, Inc., San Jose, CA (US)

( * ) Notice: Subject to any disclaimer, the term of this patent is extended or adjusted under 35 U.S.C. 154(b) by 268 days.

(21) Appl. No.: 17/444,167

(22) Filed: Jul. 30, 2021

(65) Prior Publication Data

US 2023/0037069 A1 Feb. 2, 2023

(51) Int. Cl.
| | |
|---|---|
| *G06F 21/62* | (2013.01) |
| *G06F 16/13* | (2019.01) |
| *G06F 16/28* | (2019.01) |
| *G06F 40/205* | (2020.01) |
| *G06F 40/40* | (2020.01) |

(52) U.S. Cl.
CPC .......... *G06F 21/6245* (2013.01); *G06F 16/13* (2019.01); *G06F 16/285* (2019.01); *G06F 40/205* (2020.01); *G06F 40/40* (2020.01)

(58) Field of Classification Search
None
See application file for complete search history.

(56) References Cited

U.S. PATENT DOCUMENTS

| | | | | |
|---|---|---|---|---|
| 11,775,762 B1 * | 10/2023 | Mason | ................ | G06F 40/211 |
| | | | | 704/9 |
| 2008/0275694 A1 * | 11/2008 | Varone | ................ | G06F 40/30 |
| | | | | 704/9 |
| 2010/0011000 A1 * | 1/2010 | Chakra | ................ | G06F 21/6209 |
| | | | | 707/E17.005 |
| 2010/0030755 A1 * | 2/2010 | Kim | ................ | G06F 16/58 |
| | | | | 707/726 |
| 2018/0260475 A1 * | 9/2018 | Zhang | ................ | G06F 16/335 |
| 2018/0285591 A1 * | 10/2018 | Thayer | ................ | G06F 21/6254 |
| 2018/0365529 A1 * | 12/2018 | Duan | ................ | G06N 3/045 |
| 2019/0332658 A1 * | 10/2019 | Heckel | ................ | G06N 3/08 |
| 2020/0185102 A1 * | 6/2020 | Leventhal | ................ | G06N 5/04 |
| 2020/0342059 A1 * | 10/2020 | Ziuzin | ................ | G06F 40/211 |

OTHER PUBLICATIONS

International Search Report and Written Opinion for Application No. PCT/US2022/038323 dated Nov. 2, 2022, 11 pages.

* cited by examiner

*Primary Examiner* — Kaveh Abrishamkar
(74) *Attorney, Agent, or Firm* — Haynes and Boone, LLP

(57) ABSTRACT

Systems, methods, and machine-readable media are disclosed for detecting sensitive personal information in a file. An entity extractor may extract a set of terms and a set of person candidates from a sentence in a file. Each term of the set of terms belongs to a set of sensitive categories. For a verb in the sentence, a relationship builder may determine a relationship between the respective verb, a subject, and an object in the sentence, where the respective verb, the subject, or the object includes a term. An event detector may determine, based on the relationship, that the term relates to a person from the set of set of person candidates and to a sensitive category. The event detector may create an event specifying the term, the sensitive category, and the person in response to determining that the term relates to the person and to the sensitive category.

20 Claims, 7 Drawing Sheets

CONTEXTUAL TEXT DETECTION OF SENSITIVE DATA

TECHNICAL FIELD

The present description relates to detection of sensitive personal information stored in a storage system.

BACKGROUND

Cloud computing involves the on-demand availability of cloud resources, such as storage and compute resources, to requesting users. Often, cloud compute providers may make these cloud resources available to users with an accompanying storage solution. With cloud services increasingly emerging as a key component used in many organizations, users may store large amounts of data on storage devices provided by cloud storage providers.

Organizations may face compliance issues regarding the storage of sensitive personal information. Several challenges may prevent the identification and classification of sensitive personal information in a file. For example, personal information may be stored in unstructured data and accordingly not readily identifiable, the context of the file content may be difficult to determine, a file may contain ambiguities, multiple-meanings, sarcasm, implied information, and/or non-grammatical sentences that would increase the difficulty in determining whether a file contains sensitive personal information.

Natural language processing (NLP) may help systems communicate with humans in their own language and may read text, hear speech, interpret the speech, and determine which parts are important. Contextual modeling, however, is one of the most complex NLP tasks. NLP is a field in machine learning. Approaches that simply rely on statistical modeling and classical machine learning may not be able to detect sensitive personal information stored in files.

BRIEF DESCRIPTION OF THE DRAWINGS

The present disclosure is best understood from the following detailed description when read with the accompanying figures.

DETAILED DESCRIPTION

Figure 1:
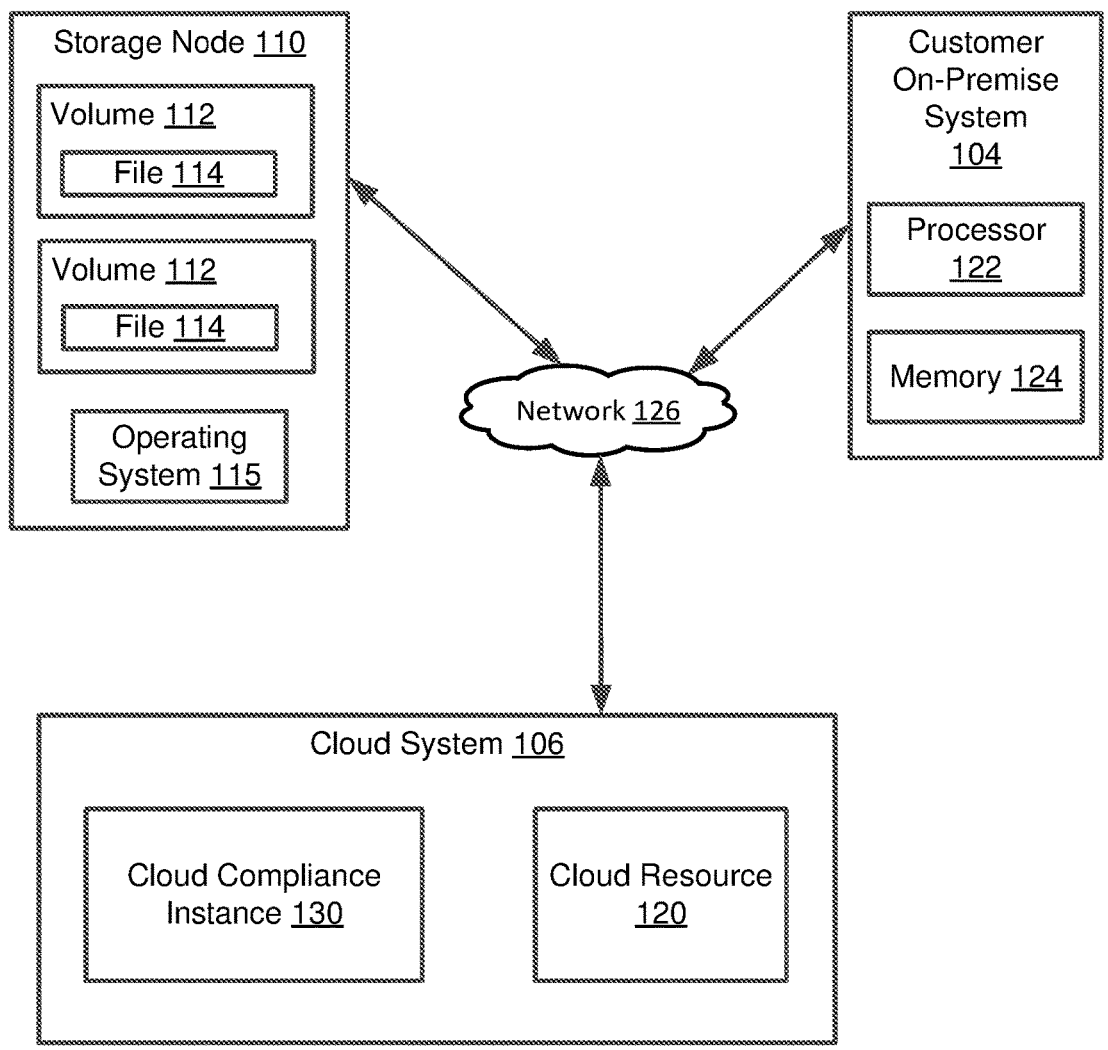
FIG. 1 illustrates a computing environment according to one or more embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for detecting sensitive personal information and/or restricting access to the sensitive personal information. This may be accomplished with an entity extractor, a relationship builder, and/or a sensitive event detector. The entity extractor extracts a set of sensitive terms and a set of person candidates from a sentence in a file. Each sensitive term of the set of sensitive terms may belong to a set of sensitive categories. For each verb in the sentence, the relationship builder may determine a relationship between the respective verb, a subject, and an object in the sentence.

The sensitive event detector may determine, based on the relationship, that the sensitive term relates to a person and to a sensitive category of the set of sensitive categories. The sensitive event detector creates a sensitive event specifying the sensitive term, the sensitive category, and the person in response to determining that the sensitive term relates to the person and to the sensitive category. The sensitive event detector may transmit a message indicating that the file contains one or more sensitive events to a client. The message may include the one or more sensitive events. Additionally, or alternatively, the sensitive event detector may restrict access to sensitive personal information based on the sensitive event.

Embodiments of the present disclosure may be discussed with reference to cloud storage platforms. This is for simplicity of discussion only. Embodiments of the present disclosure are applicable to storage systems generally, such as cloud storage platforms, server storage platforms, on-premise storage platforms, etc. The examples described below may refer to cloud storage platforms to provide illustration of details of the disclosure. The resources connected to the cloud storage platform (e.g., cloud system 106 in FIG. 1) may be hardware and/or software resources. Some examples may include storage resources and networking resources (e.g., switching resources, and/or connection resources). Storage resources may include storage nodes within clusters, where each node may include one or more storage devices. The storage devices may be hard drives, solid state drives, and/or hybrid drives. Switching devices may include network switches connecting the different components of the cloud storage platform. The switching devices may connect the cloud storage platform and a cloud computing system. The connection resources may be one or more client specific networks that may be separated.

An approach that has been used to detect sensitive personal information may include using deep learning recurrent neural networks (RNN). Deep learning RNNs may be used to capture relations between words and context. RNN is a class of artificial neural networks where connections between nodes form a directed graph along a temporal sequence. An example of RNN networks includes Long short-term memory (LS™) and Bidirectional Encoder Representations from Transformers (BERT) (just to name a few). LSTM is an artificial RNN architecture used in the field of deep learning. BERT is a language representation model and is designed to pre-train deep bidirectional representations from unlabeled text by jointly conditioning on both left and right context in all layers. Another approach that has been used to detect sensitive personal information may include using classic, rule-based NLP, which involves term matching, regular expression, and/or tailored rules. These approaches, however, may be unable to provide accuracy in terms of detection of sensitive personal information because they are unable to accurately process the context of a sentence.

The present disclosure provides techniques for detecting personal sensitive information. An advantage of the disclosure may allow entities to store data with confidence that they will be alerted if they are storing sensitive personal information that is not in compliance with a set of policies (e.g., laws). Additionally, it may be unnecessary for an organization to thoroughly train and require employees to know the set of policies because employees of the organization may be, for example, alerted if they are not in compliance with such policies. The present disclosure may provide a user with a reason regarding why a file has been classified as containing sensitive information (e.g., the file contains a particular term that is sensitive and relates to a person). Additionally, the present disclosure may improve the operation or functioning of a computer by, for example, identifying and detecting sensitive personal information based on active parsing of files including sentences containing sensitive terms and intelligent detection of a sensitive event.

FIG. 1 illustrates a computing environment 100 according to one or more embodiments of the present disclosure. The computing environment 100 may include, among other things, a customer on-premise system 104, a cloud system 106, and a storage node 110. These aspects of the computing environment 100 may communicate with each other via a network 126. The network 126 may be, for example, the Internet, a local area network (LAN), a wide area network (WAN), and/or a wireless network (to name a few examples). The network 126 may include a variety of transmission media including cables, optical fibers, wireless routers, firewalls, switches, gateways, and/or other devices to facilitate communications between one or more of the aspects of the computing environment 100.

Storage node 110 may include one or more volumes 112 (e.g., volume 112A and volume 112B), which may include an implementation of storage of information onto disk drives or disk arrays or other storage (e.g., flash) as a file system for data, for example. In an example, a disk array may include all traditional hard drives, all flash drives, or a combination of traditional hard drives and flash drives. Volumes 112 may span a portion of a disk, a collection of disks, or portions of disks, for example, and typically define an overall logical arrangement of file storage on disk space in the storage system. Volumes 112 are typically configured in formats that may be associated with particular storage systems, and respective volume formats typically include features that provide functionality to the volumes, such as providing an ability for volumes to form clusters. For example, a first storage system may utilize a first format for their volumes, and a second storage system may utilize a second format for their volumes, where the first and second formats are different from each other.

In an embodiment, volume 112 may include stored data as one or more files 114. For example, the volume 112A may include file 114A, and the volume 112B may include file 114B. The one or more files 114 may reside in a hierarchical directory structure within the volume. The file 114 may contain sensitive personal information that is affected by, for example, privacy laws. As will be discussed further below, the present disclosure provides techniques for identifying sensitive personal information in a file.

Storage node 110 may include an operating system 115, which may include several modules or "layers" executed by a network module (not shown) configured to allow the storage node 110 to connect with other devices (e.g., customer on-premise system 104 and cloud system 106) or a disk module (not shown) configured to connect one or more data storage devices (e.g., disks or arrays of disks, flash memory, or some other form of data storage), to the storage node 110. These layers may include a file system that keeps track of a hierarchical structure of the data stored in the storage devices and manages read/write operations (e.g., executes read/write operations on storage in response to client requests). The operating system 115 may establish one or more file systems on the storage node 110, where a file system can include software code and data structures that implement a persistent hierarchical namespace of files and directories, for example. The file system may logically organize stored information as a hierarchical structure for files/directories/objects at the storage devices. Each "on disk" file may be implemented as a set of blocks configured to store information, such as text, whereas a directory may be implemented as a specially formatted file in which other files and directories are stored. These data blocks may be organized within a volume block number (VBN) space that is maintained by a file system of the storage operating system 115.

A customer may access, store, and/or modify one or more files 114 stored on the storage node 110 via the customer on-premise system 104. For example, the customer on-premise system 104 may store the file 114 to the storage node 110, read the file from the storage node 110, write data to the file 114, remove data from the file 114, and/or delete the file 103 from the storage node 110.

Customer on-premise system 104 may further include a processor 122, which may be one or more processors such as multiple processors. The processor 122 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 122 may also be implemented as a combination of computing devices, e.g., a combination of a DSP and a microprocessor, a plurality of microprocessors, one or more microprocessors in conjunction with a DSP core, or any other such configuration.

The processor 122 may be connected to memory 124 to execute one or more instructions stored in the memory 124 by the processor 122. The memory 124 may include a cache memory (e.g., a cache memory of the processor 122), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 124 includes a non-transitory computer-readable medium. The memory 114 may store, or have recorded thereon, instructions. The instructions may include instructions that, when executed by the processor 122, cause the processor 122 to perform the operations described herein, such as for accessing, storing, and/or modifying files. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Storage node 110 may be incorporated in the cloud system 106 and/or the customer on-premise system 104. For example, storage node 110 is illustrated as separate from cloud system 106, though it may be an example of a cloud resource 120, as storage node 110 may be hosted and/or managed by a different entity than the cloud system 106 (e.g., a different provider for storage than a public cloud provider), but operate in cooperation with the cloud system 106 to provide storage services to one or more requests from the customer on-premise system 104. In another example, the storage node 110 may reside at the customer on-premise system 104.

Storage node 110 may be executed by a processor or multiprocessor (such as one or more of the examples given above with respect to processor 122) and memory (such as one or more of the examples given above with respect to memory 124). These may include instructions which, when executed by the processor(s) for the storage node 110, cause the processor to perform the operations described herein with respect to accessing and/or modifying one or more files.

Storage node 110 may include resources that interface with the cloud system 106. The cloud system 106 and the storage node 110 may be jointly owned or owned by separate entities. The cloud system 106 and the storage node 110 may be co-located to improve storage access speed or they may be located in different data centers. The cloud system 106 and the storage node 110 may work jointly to provide storage options to customer on-premise system 104 that are utilizing the capabilities of cloud system 106. The cloud system 106 may provide seamless access to the storage node 110 for ease of use by the customers.

Cloud system 106 may be a provider of cloud infrastructure for one or more customers, where a customer may use the customer on-premise system 104 to communicate with the cloud system 106. Cloud system 106 may provide a variety of cloud computing solutions, such as infrastructure as a service (IaaS), software as a service (SaaS), and/or platform as a service (PaaS) as some examples. For example, cloud system 106 may include a public cloud provider, examples of which include Amazon Web Services™ (AWS™) Microsoft® Azure®, and Google Cloud Platform™. These are by way of illustration. The cloud system 106 may represent a multi-tenant cloud provider that may host a variety of virtualization tools that customers may request to host or otherwise run one or more applications (e.g., via the network 126). Alternatively (or additionally), the cloud system 106 may represent a private cloud provider, such as an enterprise cloud for a given organization.

Cloud system 106 includes a cloud compliance instance 130 that ensures compliance with policies applied to data stored in one or more files 114. For example, a policy may include General Data Protection Regulation (GDPR) Article 9, which states "Processing of personal data revealing racial or ethnic origin, political opinions, religious or philosophical beliefs, or trade union membership, and the processing of genetic data, biometric data for the purpose of uniquely identifying a natural person, data concerning health or data concerning a natural person's sex life or sexual orientation shall be prohibited." In this example, the cloud compliance instance 130 may detect sensitive personal information in a file 114 and classify the pertinent information as containing sensitive data. Cloud compliance instance 130 may generate a report specifying where the violations of the policy occur.

Several challenges may prevent the identification and classification of sensitive personal information in the file 114. In some examples, personal information may be stored in unstructured data and accordingly not readily identifiable. In some examples, the context of the file content may be difficult to determine. For example, the file may include a sentence that states, "He is a fan of Mexican food" and another sentence that states, "The Mexican writer and diplomat described his childhood." In this example, the first sentence does not contain sensitive personal information, but the second sentence does contain sensitive personal information in accordance with GDPR. In some examples, a sentence may contain ambiguities, multiple-meanings, sarcasm, implied information, and/or non-grammatical sentences that would increase the difficulty in determining whether a file contains sensitive personal information.

The present disclosure provides techniques for scanning for sensitive personal information based on the textual content of a file. Cloud compliance instance 130 may implement sentence-level detection to search the file for sensitive personal information. Cloud compliance instance 130 may build information extraction or natural language processing (NLP) systems and/or may pre-process text for deep learning. In some examples, cloud compliance instance 130 may be based on a library that helps build applications that process large volumes of text. Cloud compliance instance 130 may include one or more deep neural network (DNN)-based models. A DNN-based model may include, for example, a syntactic function engine, a person candidates engine, and/or a grammatical dependency engine. The syntactic function detector may detect which category a word is assigned to in accordance with its syntactic functions (e.g., noun, pronoun, adjective, verb, adverb, indefinite article, punctuation, and preposition). The person candidates engine may detect a name of a person in a sentence and classify the named entity as a person. The grammatical dependency engine may extract the dependency parse of a sentence to represent its grammatical structure. The extracted structure may be represented as a directed graph. Dependency parsing is the process of analyzing the grammatical structure of a sentence based on the dependencies between the words in a sentence. In dependency parsing, various tags may represent the relationship between two words in a sentence. In an example, the library may be spaCy, which is a library for advanced natural language processing (NLP) in Python®. SpaCy includes the DNN-based models Part-of-speech (POS) tagging (syntactic function engine), named entity recognition (person candidates engine), and syntactic dependency parser (grammatical dependency engine).

Figure 2:
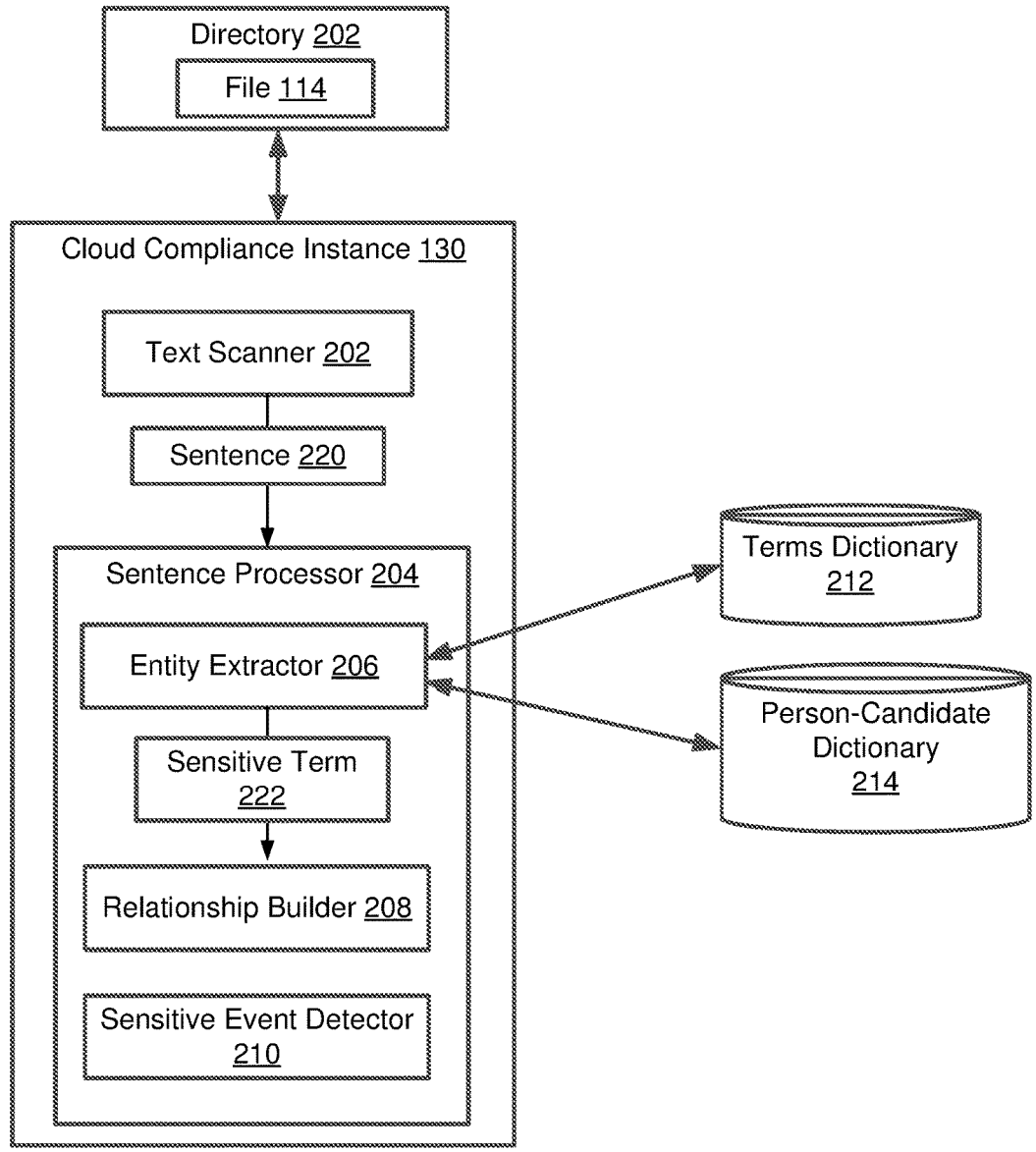
FIG. 2 illustrates a block diagram of a cloud compliance instance processing a file according to one or more embodiments of the present disclosure.

FIG. 2 illustrates a block diagram of the cloud compliance instance 130 processing a file 114 according to one or more embodiments of the present disclosure. Cloud compliance instance 130 includes a text scanner 202 and a sentence processor 204. The text scanner 202 may scan a directory 202 and detect personal sensitive information in the one or more files 114 stored in the directory 202. Although one directory 202 is shown in FIG. 2, it should be understood that text scanner 202 may scan one or more directories. The text scanner 202 may scan, load, and preprocess the one or more files 114 (e.g., all files) included in a directory 202. The text scanner 202 may preprocess the file by, for example, determining a format of the file and parsing the file into one or more sentences 220 (included in the file 114 in FIG. 1). Text scanner 202 may transmit each of the parsed sentences to sentence processor 204.

Sentence processor 204 includes an entity extractor 206, a relationship builder 208, and a sensitive event detector 210. Entity extractor 206 may determine whether the sentence 220 contains one or more sensitive terms belonging to a set of sensitive categories. In an example, the entity extractor 206 extracts one or more sensitive terms from a repository of predefined sensitive categories. A sensitive category may include one or more types of sensitive personal information, including information relating to a group protected by anti-discrimination laws, personal information types that are legally protected as confidential, and information that is generally accepted as embarrassing to an individual. An administrator or user may create and/or modify the set of sensitive categories based on the information of interest. A sensitive category may include, for example, religion, ethnicity, politics, crime, and/or health.

A sensitive category may be a sensitive term and may also be associated with other sensitive terms. A sensitive term may refer to a term that has been identified as being associated with and/or belonging to a sensitive category of the set of sensitive categories. For example, a set of sensitive terms belonging to the sensitive category "religion" may include the word "committed" (e.g., She committed herself to the work of God), church (e.g., He goes to church every Sunday), etc. In another example, a set of sensitive terms belonging to the sensitive category "ethnicity" may include "Vietnamese," "Irish," "born" (e.g., Jane Doe was born into an upper middle-class New York family and moved to Cuba), etc. In another example, a set of sensitive terms belonging to the sensitive category "crime" may include committed (e.g., He committed the crime), stole (e.g., She stole the bread), etc. In another example, a set of sensitive terms belonging to the sensitive category "health" may include therapy, pregnant, heart rate, etc.

A terms dictionary 212 may store the set of sensitive categories along with their associated sensitive terms. Entity extractor 206 may search the terms dictionary 212 for sensitive terms and/or sensitive categories. For example, the entity extractor 206 may search the terms dictionary 212 for one or more sensitive terms that match words in the sentence. Entity extractor 206 may parse each word in the sentence 220 to detect a set of sensitive terms 222. In some examples, the entity extractor 206 determines that a set of terms from a sentence in the file are stored in the terms dictionary 212. In response to a determination that the sentence 220 contains one or more sensitive terms 222, the entity extractor 206 may extract the one or more sensitive terms 222 from the sentence 220.

In some examples, entity extractor 206 locates person candidates from the sentence 220. A person candidate may refer to and describe a person. The entity extractor 206 may use, for example, name entity recognition (NER) to locate person candidates in the sentence and classify the person candidates into predefined categories. This is not intended to be limiting, and the entity extractor 206 may use other techniques to locate person candidates in the sentence and classify them into predefined categories. For example, the entity extractor 206 may extract, based on a personage list, one or more person candidates in the sentence. The personage list may be stored in a repository (e.g., internal or external repository) and may include a pronoun list (e.g., she, he, I, they, etc.) that describes a person and/or a collected list that describes a person. The collected list may, for example, include familial relationships (e.g., Mom, sister, uncle, cousin, etc.), occupations (e.g., writer, engineer, lawyer, doctor, etc.) and/or stages of life (e.g., adult, kid, teenager). A user and/or administrator may maintain the collected list. For example, the user and/or administrator may retrieve the collected list from a library and modify (e.g., add or remove person candidates) the collected list.

Figure 3:
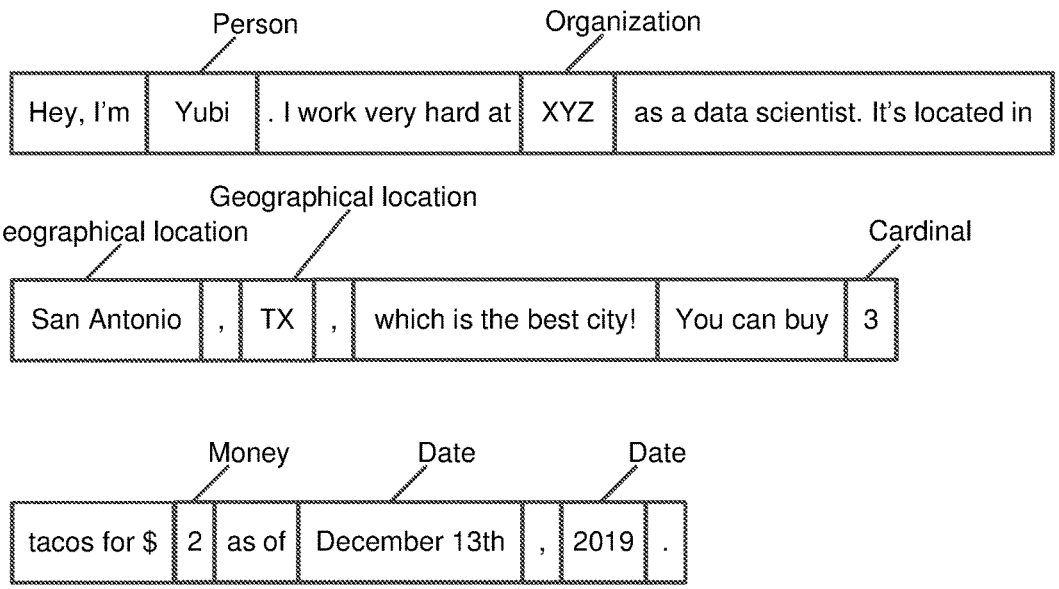
FIG. 3 illustrates an example of classified entities in accordance with one or more embodiments of the present disclosure.

FIG. 3 illustrates an example of classified entities in accordance with one or more embodiments of the present disclosure. The predefined entities categories may include person (e.g., real and fictional people), geographical location (e.g., countries, cities, and states), products (e.g., objects, vehicles, and foods), date (e.g., absolute or relative dates or periods), time (e.g., times smaller than a day), money (e.g., monetary values including unit), quantity (e.g., measurements, as of weight or distance), ordinal (e.g., first, second, etc.), organization (e.g., company names, nonprofit groups, or government groups), and/or cardinal (e.g., numerals that do not fall under another type).

In FIG. 3, the entity extractor 206 may process the first sentence, "Hey, I'm Yubi" and identify "Yubi" as a person. The entity extractor 206 may process the second sentence "I work very hard at XYZ as a data scientist" and identify "XYZ" as an organization. The entity extractor 206 may process the third sentence "It's located in San Antonio, TX, which is the best city!" and identify "San Antonio" and "TX" as geographical locations. The entity extractor 206 may process the fourth sentence "You can buy 3 tacos for $2 as of Dec. 13, 2019" and identify "3" as a cardinal, identify "2" as money, and identify "December $13^{th}$" and "2019" as dates.

To comply with policies regarding sensitive personal information, it may be desirable to detect when a sentence includes information about a person. In some examples, entity extractor 206 extracts a list of person candidates from the sentence 220 using NER. Referring back to FIG. 2, entity extractor 206 may parse each word in the sentence 220 to detect a person candidate. In response to a determination that the sentence 220 contains a set of person candidates, the entity extractor 206 may extract the set of person candidates from the sentence. In some examples, entity extractor 206 may search a person-candidate dictionary 214 for person candidates. The person-candidate dictionary 214 may store a set of names that relate to natural persons (e.g., Mr. Tumbleweed, Sarah, etc.). For example, if the person-candidate dictionary 214 stores the name "Yubi," and the entity extractor 206 may extract "Yubi" as a person candidate from the file. The entity extractor 206 may detect and extract alternative or additional entities as discussed above. For example, the entity extractor 206 may detect and extract geographical location entities in the sentence.

Relationship builder 208 may detect one or more verbs in the sentence. In some examples, the relationship builder 208 includes a syntactic function engine that detects which category a word is assigned to in accordance with its syntactic functions.

Figure 4:
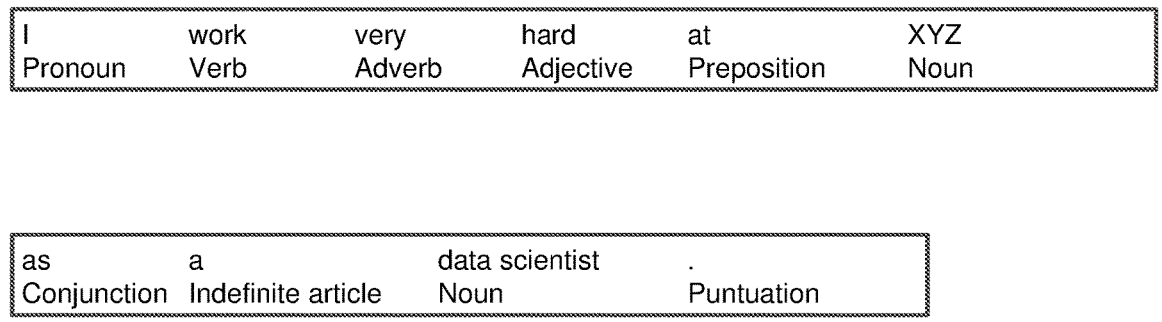
FIG. 4 illustrates an example of the categorization of words from a sentence in accordance with one or more embodiments of the present disclosure.

FIG. 4 illustrates an example of the categorization of words from a sentence in accordance with one or more embodiments of the present disclosure. In FIG. 4, the relationship builder 208 may parse the sentence "I work very hard at XYZ as a data scientist" and classify each of the parsed words in the sentence. For example, the relationship builder 208 may classify "I" as a pronoun, "work" as a verb, "very" as an adverb, and so on.

Referring back to FIG. 2, for one or more verbs in the sentence, the relationship builder 208 may determine a relationship between the respective verb, a subject, and an object in the sentence. In some examples, the relationship builder 208 may extract the dependency parse of a sentence to determine its grammatical structure. The extracted structure may be represented as a directed graph. Dependency parsing is the process of analyzing the grammatical structure of a sentence based on the dependencies between the words in a sentence. In dependency parsing, various tags may represent the relationship between two words in a sentence.

Figure 5:
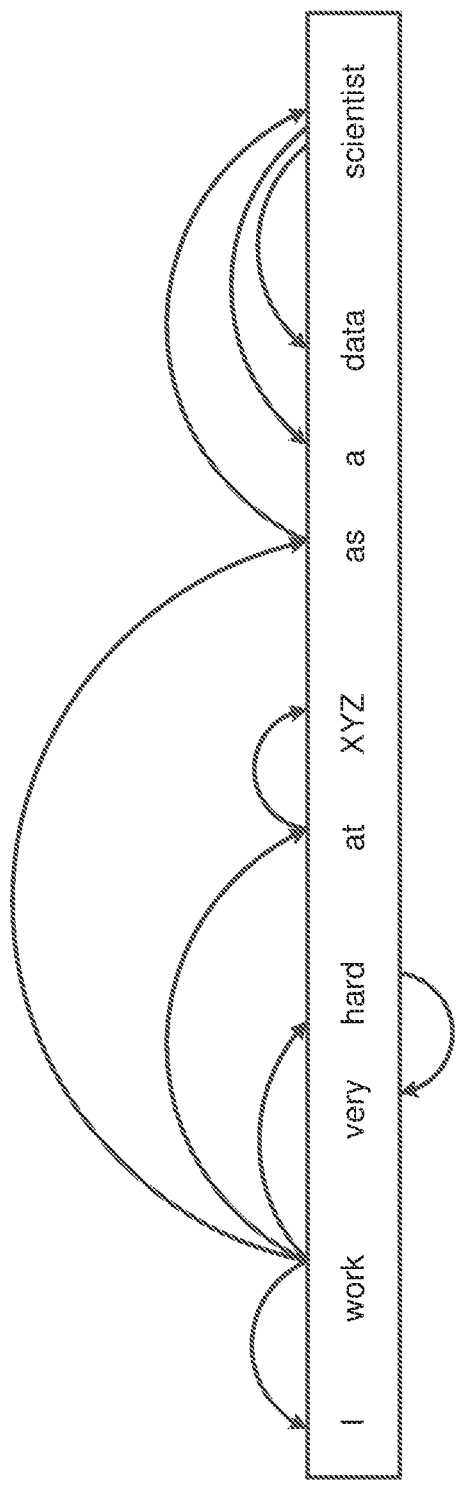
FIG. 5 illustrates an example of dependency parsing in accordance with one or more embodiments of the present disclosure.

FIG. 5 illustrates an example of dependency parsing in accordance with one or more embodiments of the present disclosure. In FIG. 5, the relationship builder 208 may parse the sentence "I work very hard at XYZ as a data scientist" and determine one or more dependencies of each of the words in the sentence. For example, the relationship builder 208 may determine that the verb "work" is associated with the pronoun "I," modifies the adjective "hard," and is associated with the preposition "at" and the conjunction "as," and so on.

For each verb in the sentence, relationship builder 208 may determine a relationship between the respective verb, a subject, and an object in the sentence. In some examples, the relationship may include a subject-verb-object (SVO) relationship in which the subject comes first (e.g., before the verb and the object), the verb comes second (e.g., between the subject and the object), and the object comes third (e.g., after the subject and the verb) in the sentence. Examples of languages that include the SVO linguistic topology include English, French, and Italian. In some examples, the relationship may include a subject-object-verb (SOV) relationship in which the subject comes first, the object comes second, and the object comes third in the sentence. Examples of languages that include the SOV linguistic topology include Bengali, Hindi, Japanese, and Korean. In some examples, the relationship may include a verb-subject-object (VSO) relationship in which the verb comes first, the subject comes second, and the object comes third in the sentence. Examples of languages that include the VSO linguistic topology include Arabic and Biblical Hebrew. In some examples, the relationship may include a verb-object-subject (VOS) relationship in which the verb comes first, the object comes second, and the subject comes third in the sentence. In some examples, the relationship may include an object-verb-subject (OVS) relationship in which the object comes first, the verb comes second, and the subject comes third in the sentence. In some examples, the relationship may include an object-subject-verb (OSV) relationship in which the object comes first, the subject comes second, and the verb comes third in the sentence.

Referring back to FIG. 2, the sensitive event detector 210 may determine whether the respective verb, the subject, or the object includes a sensitive term. In response to a determination that the respective verb, the subject, or the object does not include a sensitive term, the sensitive event detector 210 may determine that the relationship does not contain sensitive personal information. In response to a determination that the respective verb, the subject, or the object includes a sensitive term, the sensitive event detector 210 may determine whether the sensitive term relates to a person and to a sensitive category of the set of sensitive categories. In response to a determination that the sensitive term does not relate to a person and/or to a sensitive category, the sensitive event detector 210 may determine that the relationship does not contain sensitive personal information.

In some examples, the sensitive event detector 210 may also determine whether the sentence is a hypothetical statement, has a conditional context, has a questioned context, and/or includes plural statements. If the sensitive event detector 210 determines that the sentence is a hypothetical statement, has a conditional context, has a questioned context, or includes plural statements, the sensitive event detector 210 may determine that the sentence does not contain sensitive data. In response to a determination that the sensitive term relates to a person and to a sensitive category, the sensitive event detector 210 may determine that the relationship contains sensitive personal information. In response to a determination that the sensitive term relates to a person and to a sensitive category, the sensitive event detector 210 creates a sensitive event specifying the sensitive term, the sensitive category, and the person. The sensitive event detector 210 may transmit a message indicating that the file contains one or more sensitive events to a customer. The sensitive event detector 210 may store the sensitive event into a database.

In some examples, the sensitive event detector 210 analyzes the sentence further before creating the sentence. For example, the sensitive event detector 210 may determine that a relationship may be classified as containing sensitive personal information if, for example, the sentence contains at least one of implied information, a negative context, or future information (e.g., She will convert to Judaism) that is related to a natural person and to a sensitive category. In another example, the sensitive event detector 210 may determine that a relationship does not contain sensitive personal information if, for example, the sentence includes hypothetical information (e.g., She may be Jewish), conditional context, questioned context, and/or a plurality of sentences.

By way of example, the file 114 may contain one or more sentences. In an example, the sentence "I am not orthodox" is included in the file 114. In this example, the entity extractor 206 may identify the word "orthodox" as being a sensitive term belonging to a sensitive category "religion" and may accordingly extract "orthodox" from the sentence. Additionally, the entity extractor 206 may determine that the sentence contains a person candidate "I", which may be included in a pronoun list. The relationship builder 208 may determine that "am" is a verb and accordingly determine a relationship between "am," "I," and "orthodox." The relationship may be a SVO relationship in which the subject is "I", the verb is "am, and the object is "orthodox." The object "orthodox" includes the sensitive term. Additionally, the relationship builder 208 may determine that the verb "am" is negated in the sentence and has no other related verbs in the sentence. The relationship builder 208 may also determine that the sentence is not a conditional sentence. Based on the relationship, the sensitive event detector 210 may determine that the sensitive term ("orthodox") relates to a person ("I") and to a sensitive category ("religion"). The sensitive event detector 210 may create a sensitive event specifying the sensitive term ("orthodox"), the sensitive category ("religion"), and the person ("I") in response to determining that the sensitive term relates to the person and to the sensitive category.

In another example, the sentence "Mr. Stephen Graham Twibill pleaded guilty to and was convicted of a number of crimes" is included in the file 114. In this example, the entity extractor 206 may identify the words "guilty" and "crime" as being sensitive terms belonging to a sensitive category "crime" and may accordingly extract "guilty" and "crime" from the sentence. Additionally, the entity extractor 206 may determine that the sentence contains person candidates "Mr. Stephen Graham Twibill" and "Stephen Graham Twibill." The relationship builder 208 may determine that "pleaded" is a verb and accordingly determine a relationship between "pleaded," "Mr. Stephen Graham Twibill," and "guilty." The relationship may be a SVO relationship in which the subject is "Mr. Stephen Graham Twibill", the verb is "pleaded," and the object is "guilty." The object "guilty" includes the sensitive term. Additionally, the relationship builder 208 may determine that the verb "pleaded" is not negated in the sentence and has no other related verbs in the sentence. The relationship builder 208 may also determine that the sentence is not a conditional sentence. Based on the relationship, the sensitive event detector 210 may determine that the sensitive term ("guilty") relates to a person ("Mr. Stephen Graham Twibill") and to a sensitive category ("crime"). The sensitive event detector 210 may create a sensitive event specifying the sensitive term ("guilty"), the sensitive category ("crime"), and the person ("Mr. Stephen Graham Twibill") in response to determining that the sensitive term relates to the person and to the sensitive category.

In another example, the sentence "As a kid, I scarfed bags of the Calbee Sweet Potato chips that my mom would pick up at the local Asian market" is included in the file 114. In this example, the entity extractor 206 may identify the word "Asian" as being a sensitive term belonging to a sensitive category "ethnicity" and may accordingly extract "Asian" from the sentence. Additionally, the entity extractor 206 may determine that the sentence contains a person candidate "mom". The relationship builder 208 may determine that "pick" is a verb and accordingly determine a relationship between "pick," "my mom," and "the local Asian market." The relationship may be a SVO relationship in which the subject is "mom," the verb is "pick," and the object is "the local Asian market." The object "the local Asian market" includes the sensitive term. Additionally, the relationship builder 208 may determine that the verb "pick" is not negated in the sentence and has no other related verbs in the sentence. The relationship builder 208 may also determine that the sentence is not a conditional sentence. Based on the relationship, the sensitive event detector 210 may determine that the sensitive term ("Asian") does not relate to a person. Rather, the sensitive term ("Asian") relates to the market. The sensitive event detector 210 may determine that the sentence does not include a sensitive event.

The sensitive event detector 210 may transmit a message indicating that the file contains one or more sensitive events to a client. Additionally, or alternatively, in response to determining that the sensitive term relates to the person and to the sensitive category, the sensitive event detector 210 may restrict access to the file until a condition is satisfied (e.g., the client removes the sensitive data, the client encrypts the sensitive data, etc.). The client may receive the message and perform actions on the file (e.g., remove the sensitive data, encrypt the sensitive data, etc.). In some examples, the sensitive event detector 210 encrypts the file or at least the sentence containing the sensitive event. In some examples, the sensitive event detector 210 locks access to the file until an administrator or a user with elevated privileges provides acknowledgment to the sensitive event detector 210 that the file contains sensitive information. For example, the sensitive event detector 210 may send, to the administrator or the user, a message indicating that the file contains sensitive information. If the message contains a user-selectable option (e.g., link or button) indicating that the administrator or the user acknowledges that the file contains sensitive information, the administrator or the user may select the user-selectable option.

Figure 6:
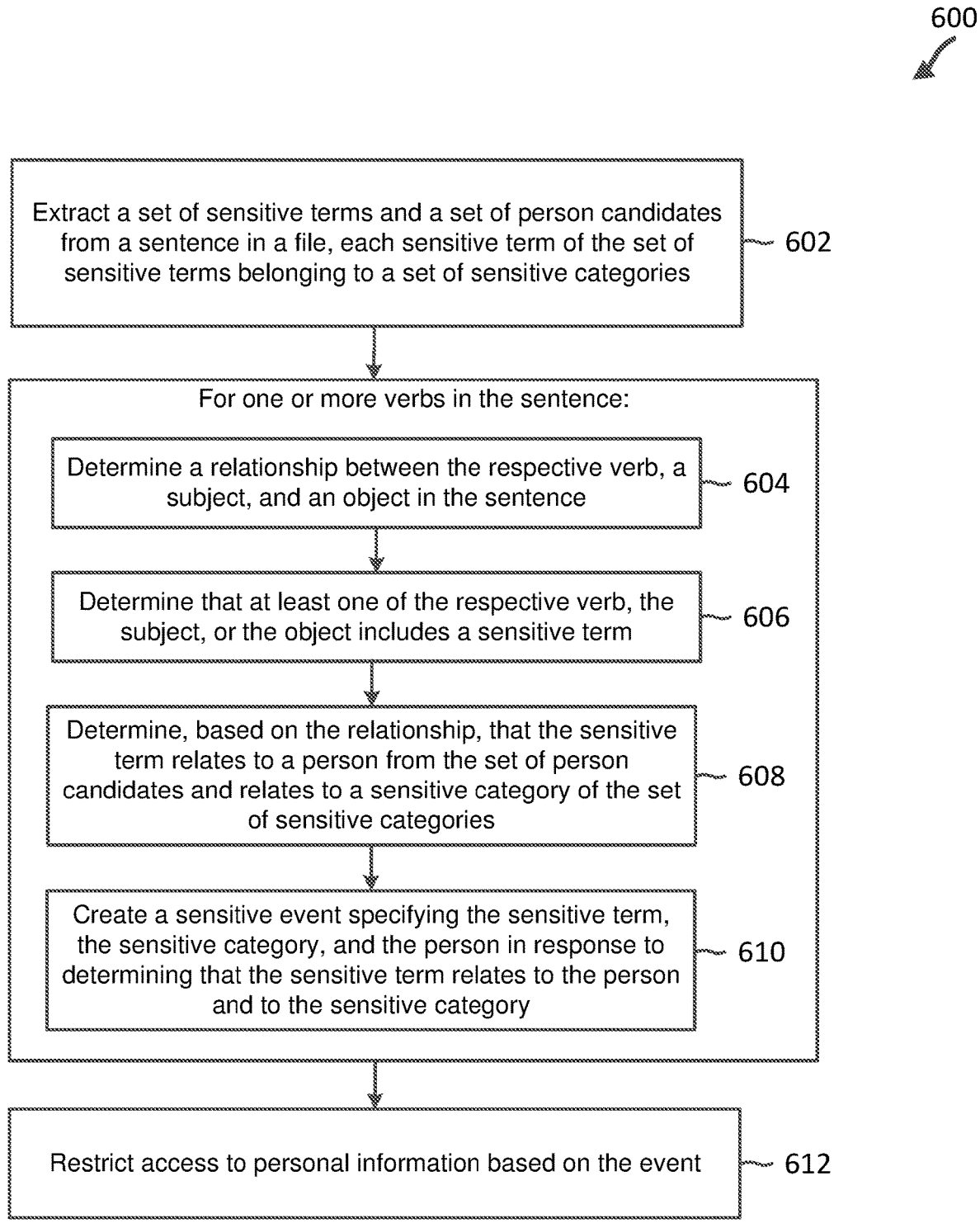
FIG. 6 illustrates an exemplary process flow for detecting a sensitive event according to one or more embodiments of the present disclosure.

Turning now to FIG. 6, an exemplary process flow 600 for detecting a sensitive event according to one or more embodiments of the present disclosure is illustrated. FIG. 6 illustrates the flow 600 between different components of a storage node 110, customer on-premise system 104, and cloud system 106. While described with respect to a single sentence in a file, the actions illustrated in FIG. 6 may apply to each sentence in one or more files.

At action 602, the entity extractor 206 extracts a set of sensitive terms and a set of person candidates from a sentence in a file, each sensitive term of the set of sensitive terms belonging to a set of sensitive categories. An administrator and/or a user may insert terms that have been classified as being sensitive terms into a term dictionary. The entity extractor 206 may search the term dictionary and determine whether any of the stored sensitive terms match any of the words in the sentence. If the entity extractor 206 finds a match, the entity extractor 206 may extract that term from the sentence. The set of person candidates may be based on a set of person entities that the entity extractor 206 identifies in the sentence (e.g., using NER) and/or based on a personage list. The personage list may include a pronoun list and/or a collected list that describes a person. A person candidate may refer to and describe a person.

For one or more verbs in a sentence, the sentence processor 204 may perform actions 604, 606, 608, and 610. The sentence processor 204 may include a syntactic function engine that identifies verbs in the sentence. At action 604, the relationship builder 208 determines a relationship between a respective verb, a subject, and an object in the sentence, at least one of the respective verb, the subject, or the object including a sensitive term. The relationship, may be, for example a SVO relationship, SOV relationship, VSO relationship, VOS relationship, OVS relationship, or a OSV relationship.

At action 606, the sensitive event detector 210 determines, based on the relationship, that the sensitive term relates to a person from the set of person candidates and to a sensitive category of the set of sensitive categories. The sensitive event detector 210 may include a grammatical dependency engine that extracts the dependency parse of the sentence to represent its grammatical structure. The extracted structure may be represented as a directed graph, and the sensitive event detector 210 may determine, based on the dependency parse, whether the sensitive term relates to the person and/or to a sensitive category.

At action 608, the sensitive event detector 210 creates a sensitive event specifying the sensitive term, the sensitive category, and the person in response to determining that the sensitive term relates to the person and to the sensitive category. The sensitive event may indicate that the file stores sensitive personal information.

At action 610, the sensitive event detector 210 restricts access to personal information based on the event. The sensitive event detector 210 may perform further actions such as transmitting, to a client associated with the file, a message indicating that the file contains one or more sensitive events. For example, the client may own the file and/or pay for the storage of the file on a third-party system. For example, the sensitive event detector 210 may encrypt the sensitive personal information, may allow a user to set up multiple level authentication to access the sensitive personal information, may request the user to acknowledge that the file contains sensitive personal information before being allowed access to the file, etc.

Figure 7:
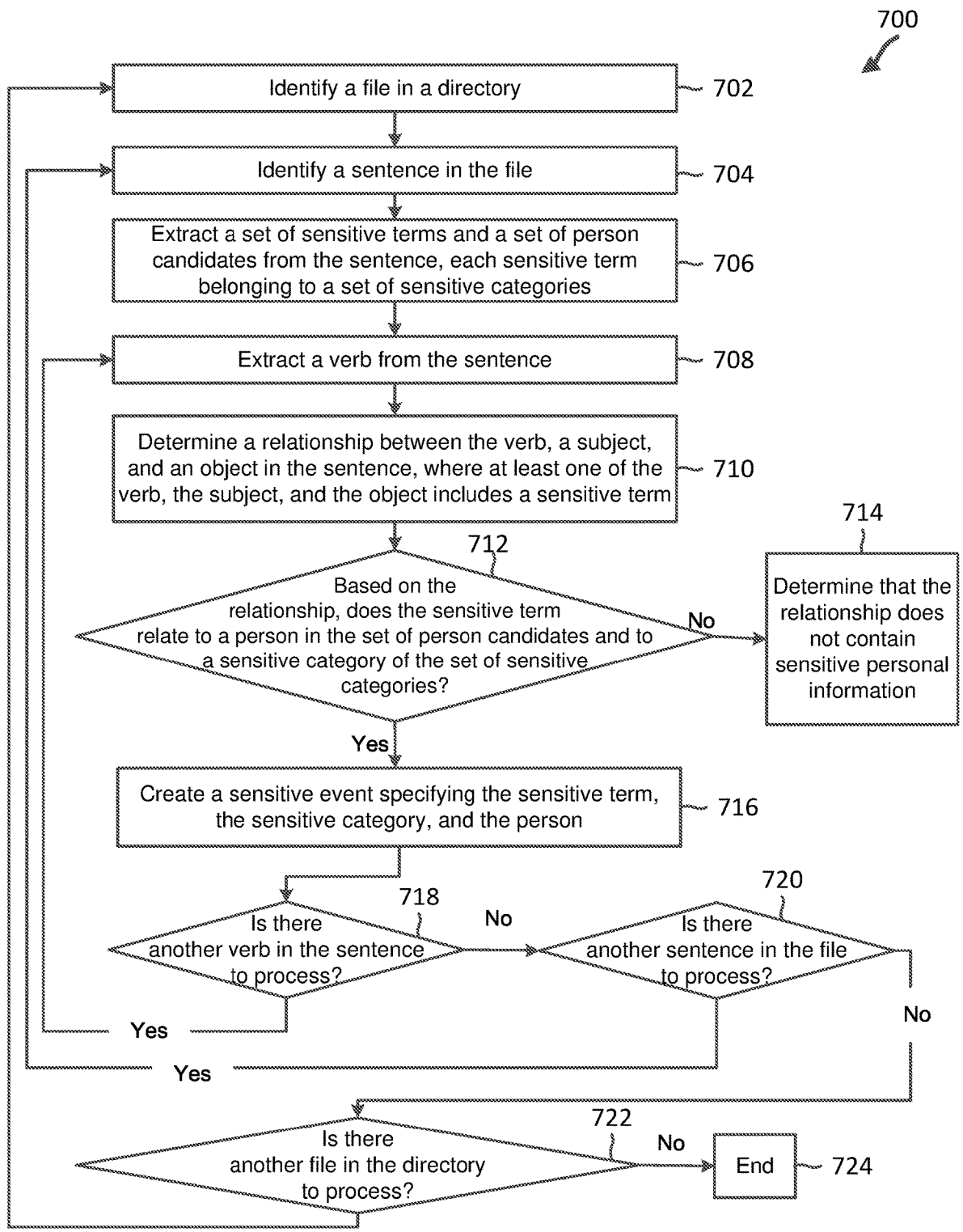
FIG. 7 illustrates an exemplary process flow for detecting a sensitive event according to one or more embodiments of the present disclosure is illustrated.

Turning now to FIG. 7, an exemplary process flow 700 for detecting a sensitive event according to one or more embodiments of the present disclosure is illustrated. FIG. 7 illustrates the flow 700 between different components of a storage node 110, customer on-premise system 104, and cloud system 106.

At action 702, the text scanner 202 identifies a file in a directory. The directory may include one or more files. Additionally, a file may be in one or more formats (e.g., spreadsheet, word processor, etc.).

At action 704, the text scanner 202 identifies a sentence in the file. The file may contain one or more sentences, and the text scanner 202 may parse each of the sentences in the file. At action 706, the entity extractor 206 extracts a set of sensitive terms and a set of person candidates from the sentence, each sensitive term belonging to a set of sensitive categories. At action 708, the entity extractor 206 extracts a verb from the sentence. At action 710, the relationship builder 208 determines a relationship between the verb, a subject, and an object in the sentence, where at least one of the verb, a subject, and an object in the sentence includes a sensitive term.

At action 712, the sensitive event detector 210 determines, based on the relationship, whether the sensitive term relates to a person in the set of person candidates and to a sensitive category of the set of sensitive categories. If the sensitive event detector 210 determines, based on the relationship, that the sensitive term does not relate to a person or to a sensitive category of the set of sensitive categories, process flow may proceed to action 714. At action 714, the sensitive event detector 210 determines that the relationship does not contain sensitive personal information. Accordingly, the sensitive event detector 210 does not create a sensitive event based on the relationship. If the sensitive event detector 210 determines, based on the relationship, that the sensitive term relates to a person and to a sensitive category of the set of sensitive categories, process flow may proceed to action 716. At action 716, the sensitive event detector 210 creates a sensitive event specifying the sensitive term, the sensitive category, and the person.

At action 718, the cloud compliance instance 130 determines whether there is another verb in the sentence to process. If the cloud compliance instance 130 determines that there is another verb in the sentence to process, process flow may proceed to action 708. Action 708 may be performed until all the verbs in the sentence have been processed. If the cloud compliance instance 130 determines that there is not another verb in the sentence to process, process flow may proceed to action 720.

At action 720, the cloud compliance instance 130 determines whether there is another sentence in the file to process. If the cloud compliance instance 130 determines that there is another sentence in the file to process, process flow may proceed to action 704. Action 704 may be performed until all the sentences in the file have been processed. If the cloud compliance instance 130 determines that there is not another sentence in the file to process, process flow may proceed to action 722. At action 722, the cloud compliance instance 130 determines whether there is another file in the directory to process. If the cloud compliance instance 130 determines that there is another file in the directory to process, process flow may proceed to action 702. Action 702 may be performed until all the files in the directory have been processed. If the cloud compliance instance 130 determines that there is not another file in the directory to process, process flow may proceed to action 724. At action 724, the method 700 ends.

Figure 8:
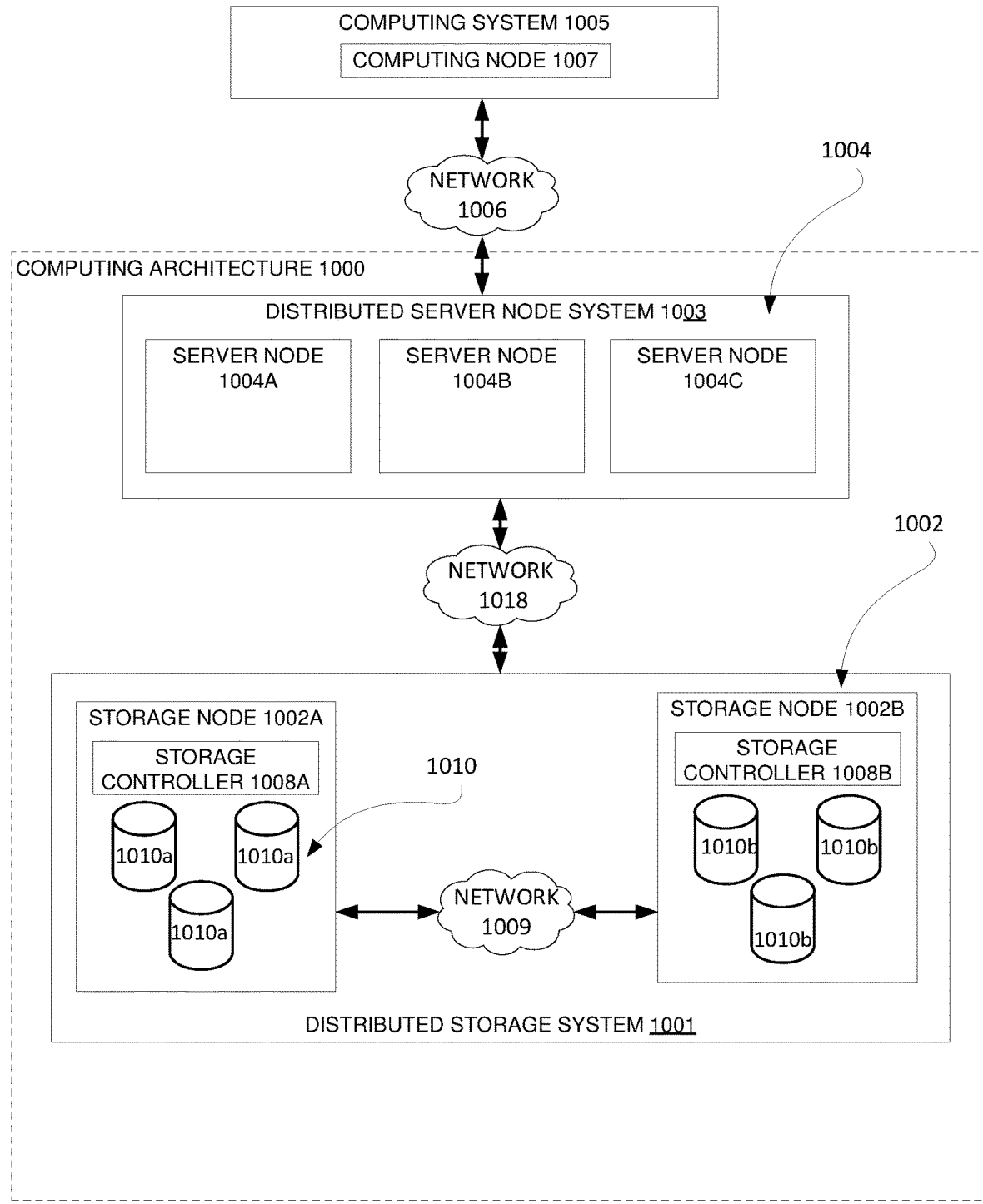
FIG. 8 is an illustration of a computing architecture in accordance with one or more embodiments of the present disclosure.

FIG. 8 is an illustration of a computing architecture 1000 in accordance with one or more embodiments of the present disclosure. The computing architecture 1000 is an example of one manner in which one or more of the computing architectures described herein may be implemented. The computing architecture 1000, which, in some cases includes a distributed storage system 1001 including a number of storage nodes 1002 (e.g., storage node 1002a, storage node 1002b) in communication with a distributed server node system 1003 including a number of server nodes 1004 (e.g., server node 1004a, server node 1004b, server node 1004c).

A computing system 1005 communicates with the computing architecture 1000, and in particular, the distributed server node system 1003, via a network 1006. The network 1006 may include any number of wired communications links, wireless communications links, optical communications links, or combination thereof. In one or more examples, the network 1006 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 1005 may include, for example, at least one computing node 1007. The computing node 1007 may be implemented using hardware, software, firmware, or a combination thereof. In one or more other examples, the computing node 1007 is a client (or client service, customer, etc.) and the computing system 1005 that the client runs on is, for example, a physical server, a workstation, etc.

The storage nodes 1002 may correspond to the storage node 110 in FIG. 1 and may be coupled via a network 1009, which may include any number of wired communications links, wireless communications links, optical communications links, or a combination thereof. For example, the network 1009 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 1009 may use a transmission control protocol/Internet protocol (TCP/IP), a remote direct memory access (RDMA) protocol (e.g., Infiniband®, RDMA over Converged Ethernet (RoCE) protocol (e.g., RoCEv1, RoCEv2), iWARP), and/or another type of protocol. Network 1009 may be local or remote with respect to a rack or datacenter. Additionally, or in the alternative, the network 1009 may extend between sites in a WAN configuration or be a virtual network extending throughout a cloud. Thus, the storage nodes 1002 may be as physically close or widely dispersed as needed depending on the application of use. In some examples, the storage nodes 1002 are housed in the same racks. In other examples, the storage nodes 1002 are located in different facilities at different sites around the world. The distribution and arrangement of the storage nodes 1002 may be determined based on cost, fault tolerance, network infrastructure, geography of the server nodes 1004, another consideration, or a combination thereof.

The distributed storage system 1001 processes data transactions on behalf of other computing systems such as, for example, the one or more server nodes 1004. The distributed storage system 1001 may receive data transactions from one or more of the server nodes 1004 and take an action such as reading, writing, or otherwise accessing the requested data. The data may include files such as file 114 in FIG. 1. These data transactions may include server node read requests to read data from the distributed storage system 1001 and/or server node write requests to write data to the distributed storage system 1001. For example, in response to a request from one of the server nodes 1004a, 1004b, or 1004c, one or more of the storage nodes 1002 of the distributed storage system 1001 may return requested data, a status indictor, some other type of requested information, or a combination thereof, to the requesting server node.

While two storage nodes 1002a and 1002b and three server nodes 1004a, 1004b, and 1004c are shown in FIG. 8, it is understood that any number of server nodes 1004 may be in communication with any number of storage nodes 1002. A request received from a server node, such as one of the server nodes 1004a, 1004b, or 1004c may originate from, for example, the computing node 1007 (e.g., a client service implemented within the computing node 1007) or may be generated in response to a request received from the computing node 1007 (e.g., a client service implemented within the computing node 1007).

While each of the server nodes 1004 and each of the storage nodes 1002 is referred to as a singular entity, a server node (e.g., server node 1004a, server node 1004b, or server node 1004c) or a storage node (e.g., storage node 1002a, or storage node 1002b) may be implemented on any number of computing devices ranging from a single computing system to a cluster of computing systems in communication with each other. In one or more examples, one or more of the server nodes 1004 may be run on a single computing system, which includes at least one processor such as a microcontroller or a central processing unit (CPU) operable to perform various computing instructions that are stored in at least one memory. In one or more examples, at least one of the server nodes 1004 and at least one of the storage nodes 1002 reads and executes computer readable code to perform the methods described further herein to detect sensitive personal information. The instructions may, when executed by one or more processors, cause the one or more processors to perform various operations described herein in connection with examples of the present disclosure. Instructions may also be referred to as code, as noted above.

A processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); at least one network interface such as an Ethernet interface, a wireless interface (e.g., IEEE 1002.11 or other suitable standard), a SAN interface, a Fibre Channel interface, an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 1002 contains any number of storage devices 1010 for storing data and can respond to data transactions by the one or more server nodes 1004 so that the storage devices 1010 appear to be directly connected (i.e., local) to the server nodes 1004. For example, the storage node 1002a may include one or more storage devices 1010a and the storage node 1002b may include one or more storage devices 1010b. In various examples, the storage devices 1010 include HDDs, SSDs, and/or any other suitable volatile or non-volatile data storage medium. In some examples, the storage devices 1010 may be relatively homogeneous (e.g., having the same manufacturer, model, configuration, or a combination thereof). However, in other examples, one or both of the storage node 1002a and the storage node 1002b may alternatively include a heterogeneous set of storage devices 1010a or a heterogeneous set of storage device 1010b, respectively, that includes storage devices of different media types from different manufacturers with notably different performance. The storage devices 1010 may store files such as file 114 in FIG. 1.

The storage devices 1010 in each of the storage nodes 1002 are in communication with one or more storage controllers 1008. In one or more examples, the storage devices 1010a of the storage node 1002a are in communication with the storage controller 1008a, while the storage devices 1010b of the storage node 1002b are in communication with the storage controller 1008b. While a single storage controller (e.g., 1008a, 1008b) is shown inside each of the storage node 1002a and 1002b, respectively, it is understood that one or more storage controllers may be present within each of the storage nodes 1002a and 1002b.

The storage controllers 1008 exercise low-level control over the storage devices 1010 in order to perform data transactions on behalf of the server nodes 1004, and in so doing, may group the storage devices 1010 for speed and/or redundancy using a protocol such as RAID (Redundant Array of Independent/Inexpensive Disks). The grouping protocol may also provide virtualization of the grouped storage devices 1010. At a high level, virtualization includes mapping physical addresses of the storage devices 1010 into a virtual address space and presenting the virtual address space to the server nodes 1004, other storage nodes 1002, and other requestors. Accordingly, each of the storage nodes 1002 may represent a group of storage devices as a volume. A requestor can therefore access data within a volume without concern for how it is distributed among the underlying storage devices 1010.

The distributed storage system 1001 may group the storage devices 1010 for speed and/or redundancy using a virtualization technique such as RAID or disk pooling (that may utilize a RAID level). The storage controllers 1008a and 1008b are illustrative only; more or fewer may be used in various examples. In some cases, the distributed storage system 1001 may also be communicatively coupled to a user display for displaying diagnostic information, application output, and/or other suitable data.

With respect to the distributed server node system 1003, each of the one or more server nodes 1004 includes any computing resource that is operable to communicate with the distributed storage system 1001, such as by providing server node read requests and server node write requests to the distributed storage system 1001. In one or more examples, each of the server nodes 1004 is a physical server. In one or more examples, each of the server nodes 1004 includes one or more host bus adapters (HBA) 1016 in communication with the distributed storage system 1001. The HBA 1016 may provide, for example, an interface for communicating with the storage controllers 1008 of the distributed storage system 1001, and in that regard, may conform to any suitable hardware and/or software protocol. In various examples, the HBAs 1016 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 1016 of the server nodes 1004 may be coupled to the distributed storage system 1001 by a network 1018 comprising any number of wired communications links, wireless communications links, optical communications links, or combination thereof. For example, the network 1018 may include a direct connection (e.g., a single wire or other point-to-point connection), a networked connection, or any combination thereof. Examples of suitable network architectures for the network 1018 include a LAN, an Ethernet subnet, a PCI or PCIe subnet, a switched PCIe subnet, a WAN, a MAN, the Internet, Fibre Channel, or the like. In many examples, a server node 1004 may have multiple communications links with a single distributed storage system 1001 for redundancy. The multiple links may be provided by a single HBA 1016 or multiple HBAs 1016 within the server nodes 1004. In some examples, the multiple links operate in parallel to increase bandwidth.

In one or more examples, each of the server nodes 1004 may have another HBA that is used for communication with the computing system 1005 over the network 1007. In other examples, each of the server nodes 1004 may have some other type of adapter or interface for communication with the computing system 1005 over the network 1007.

To interact with (e.g., write, read, modify, etc.) remote data, a HBA 1016 sends one or more data transactions to the distributed storage system 1001. Data transactions are requests to write, read, or otherwise access data stored within a volume (e.g., volume 112 in FIG. 1) in the distributed storage system 1001, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 1001 executes the data transactions on behalf of the server nodes 1004 by writing, reading, or otherwise accessing data on the relevant storage devices 1010. A distributed storage system 1001 may also execute data transactions based on applications running on the distributed server node system 1003. For some data transactions, the distributed storage system 1001 formulates a response that may include requested data, status indicators, error messages, and/or other suitable data and provides the response to the provider of the transaction.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   extracting, by a cloud compliance server node, a set of terms and a set of person candidates from a sentence in an electronic file, each term of the set of terms belonging to a set of categories;
   for each verb in the sentence:
      determining, by a sentence processor of the cloud compliance server node, a relationship between a respective verb, a subject, and an object in the sentence, at least one of the respective verb, the subject, or the object including a first term belonging to a sensitive category of the set of categories;
      determining, by the sentence processor and based on the relationship, that the first term relates to a person of the set of person candidates and to the sensitive category of the set of categories, the determining that the first term relates includes using a deep neural network to perform active parsing of the sentence to determine a dependency between the person of the set of person candidates and the first term belonging to the sensitive category; and
      creating an event, by the sentence processor, specifying the first term, the category, and the person in response to determining that the first term relates to the person and to the sensitive category; and
   restricting, by the cloud compliance server node, access to the electronic file by a customer on-premise system based on the event.

2. The method of claim 1, comprising:
   transmitting, to a client computer that owns the electronic file, a network message indicating that the electronic file contains one or more events.

3. The method of claim 1, comprising:
   scanning a directory including one or more files, the one or more files including one or more sentences.

4. The method of claim 1, comprising:
   generating an object including a list of events, each event in the list of events including a name of the electronic file, the sentence, the set of terms, the person, and the sensitive category.

5. The method of claim 1, wherein the extracting the set of person candidates includes extracting one or more person candidates using name entity recognition (NER).

6. The method of claim 1, wherein the extracting the set of person candidates includes extracting one or more person candidates based on a personage list.

7. The method of claim 1, wherein the relationship includes a subject-verb-object relationship.

8. The method of claim 1, wherein the creating the event includes creating the event in response to determining that the sentence includes implied or future information that is related to the person and the sensitive category.

9. The method of claim 1, wherein the creating the event includes creating the event in response to determining that the sentence does not include hypothetical information, the sentence does not include a conditional context, and the sentence does not include a questioned context.

10. A computing device comprising:
    a memory containing a machine-readable medium comprising machine executable code having stored thereon instructions for detecting a sensitive event; and
    a sentence processor coupled to the memory, the sentence processor having an entity extractor, a relationship builder, and a sensitive event detector, the sentence processor is configured to execute the machine executable code to cause the sentence processor to:
       determine, by the entity extractor, that a set of terms from a sentence in a file are stored in a terms dictionary, the terms dictionary storing sensitive terms associated with a set of sensitive categories;
       determine, by the entity extractor, that the sentence specifies a person included in a set of person candidates;
       for each verb in the sentence:
          determine, by the relationship builder, a relationship between the verb, a subject, and an object in the sentence, at least one of the verb, the subject, or the object including a sensitive term belonging to a sensitive category of the set of sensitive categories;
          determine, by the relationship builder, based on the relationship, that the sensitive term corresponds to the person, the determining that the sensitive term corresponds to the person includes using a deep neural network to perform active parsing of the sentence; and create, by the sensitive event detector, an event specifying the sensitive term, the sensitive category, and the person in response to a determination that the sensitive term corresponds to the person; and restrict access to sensitive information based on the event.

11. The computing device of claim 10, wherein the machine executable code further causes the sentence processor to:

transmit, to a client associated with the file, a message including the event.

12. The computing device of claim 10, wherein the set of person candidates is based on a personage list and based on using name entity recognition (NER) on the sentence.

13. The computing device of claim 10, wherein the machine executable code further causes the sentence processor to:

search the terms dictionary for one or more sensitive terms that match words in the sentence.

14. The computing device of claim 10, wherein the relationship includes a subject-verb-object relationship.

15. A non-transitory machine-readable medium having stored thereon instructions for performing a method of creating a sensitive event, which when executed by at least one machine, causes the at least one machine to:

for a sentence in a file:
extract a set of sensitive terms and a set of person candidates from the sentence in the file, wherein each sensitive term of the set of sensitive terms belongs to a set of sensitive categories; and for each verb in the sentence:
determine a dependency relationship between the verb, a subject, and an object in the sentence;
determine that at least one of the verb, the subject, or the object includes a sensitive term of the set of sensitive terms;
determine, based on the dependency relationship, that the sensitive term relates to a person of the set of person candidates and to a sensitive category of the set of sensitive categories, the determining that the sensitive term relates includes using a deep neural network to perform active parsing of the sentence; and
create an event specifying the sensitive term, the sensitive category, and the person in response to a determination that the sensitive term relates to the person; and restrict the file from being accessed by another machine, based on the event.

16. The non-transitory machine-readable medium of claim 15, further comprising instructions, when executed by the at least one machine, causes the at least one machine to:

transmit a message indicating that the file contains one or more events to a client.

17. The non-transitory machine-readable medium of claim 15, wherein the set of person candidates includes a first list of person candidates based on a personage list and a second list of person candidates based on using name entity recognition (NER) on the sentence.

18. The non-transitory machine-readable medium of claim 15, wherein the event is created in response to a determination that the sentence includes implied or future information that is related to the person and the sensitive category.

19. The non-transitory machine-readable medium of claim 15, wherein the event is created in response to a determination that the sentence does not include hypothetical information, the sentence does not include a conditional context, and the sentence does not include a questioned context.

20. The non-transitory machine-readable medium of claim 15, wherein the relationship includes a subject-verb-object relationship.

* * * * *